(12) United States Patent
Liikanen et al.

(10) Patent No.: US 7,193,807 B1
(45) Date of Patent: Mar. 20, 2007

(54) METHOD AND APPARATUS FOR REDUCING EFFECTIVE TRACK WIDTH THROUGH HIGHLY SKEWED HEAD ANGLES

(75) Inventors: Bruce Liikanen, Berthoud, CO (US); John C. Purkett, Longmont, CO (US); Terry Keefer, Boulder, CO (US)

(73) Assignee: Maxtor Corporation, Scotts Valley, CA (US)

( * ) Notice: Subject to any disclaimer, the term of this patent is extended or adjusted under 35 U.S.C. 154(b) by 16 days.

(21) Appl. No.: 09/954,997

(22) Filed: Sep. 17, 2001

Related U.S. Application Data

(60) Provisional application No. 60/232,810, filed on Sep. 15, 2000.

(51) Int. Cl.
G11B 5/00 (2006.01)
G11B 20/20 (2006.01)
G11B 5/596 (2006.01)

(52) U.S. Cl. .................................... 360/76; 360/78.04
(58) Field of Classification Search ................ 360/75, 360/76
See application file for complete search history.

(56) References Cited

U.S. PATENT DOCUMENTS

| | | | |
|---|---|---|---|
| 4,945,427 A * | 7/1990 | Cunningham | 360/75 |
| 5,631,789 A | 5/1997 | Dion et al. | 360/106 |
| 5,724,212 A * | 3/1998 | Mallary et al. | 360/264.1 |
| 5,790,341 A * | 8/1998 | Cunningham et al. | 360/76 |
| 5,793,550 A * | 8/1998 | Nepela et al. | 360/66 |
| 5,796,558 A * | 8/1998 | Hanrahan et al. | 360/294.6 |
| 6,002,540 A * | 12/1999 | Cunningham et al. | 360/77.04 |
| 6,021,024 A | 2/2000 | Akiyama et al. | 360/106 |
| 6,094,806 A | 8/2000 | McNeil et al. | 29/603.14 |
| 6,104,563 A | 8/2000 | Dovek et al. | 360/66 |
| 6,157,510 A | 12/2000 | Schreck et al. | 360/77.06 |
| 6,172,832 B1 | 1/2001 | Dovek et al. | 360/66 |
| 6,778,343 B2 * | 8/2004 | Nunnelley | 360/31 |

* cited by examiner

Primary Examiner—Wayne Young
Assistant Examiner—Daniell L. Negrón
(74) Attorney, Agent, or Firm—Tejpal S. Hansra

(57) ABSTRACT

A disk drive provides increased read and write element widths and tolerances, and also provides reduced track widths. The head with the read and write elements has a large skew angle relative to the tracks on the disk. The skew angle reduces the effective width of the read and write elements. Based on this reduction in effective width, the physical width of the read and write elements may be increased. Furthermore, the width of the tracks may be reduced instead of, or in addition to, the increased read and write element width.

74 Claims, 5 Drawing Sheets

METHOD AND APPARATUS FOR REDUCING EFFECTIVE TRACK WIDTH THROUGH HIGHLY SKEWED HEAD ANGLES

This application claims priority from U.S. Provisional Application Ser. No. 60/232,810, filed Sep. 15, 2000 entitled "Reducing Effective Track Width Through Highly Skewed Head Angles," which is incorporated by reference in its entirety.

FIELD OF THE INVENTION

The present invention relates to magnetic storage devices, and, more particularly, to increasing track density on a magnetic storage medium and increasing head width tolerance.

BACKGROUND OF THE INVENTION

A diagrammatic representation of a conventional disk drive 10 is illustrated in FIG. 1. The disk drive 10 includes a disk 12 that is rotated by a spindle motor 14. Digital information is stored within concentric tracks on the disk 12 which is coated with a magnetic material that is capable of changing its magnetic orientation in response to an applied magnetic field. The spindle motor 14 is mounted on a base plate 16. An actuator arm assembly 18 is also mounted on the base plate 16. The disk drive 10 also includes a cover (not shown) that is coupled to the base plate 16 and encloses the disk 12 and the actuator arm assembly 18.

The actuator arm assembly 18 includes a flexure arm 20 mounted on an actuator arm 22 and a head 24 is mounted on the end of the flexure arm 20 opposite the actuator arm 22. The head 24 is constructed to magnetize the disk 12 and sense the magnetic field emanating therefrom.

The head 24 can include a single read/write element such as an inductive read/write element for both reading and writing, or it can include separate read and write elements. Heads that include separate elements for reading and writing are known as "dual element heads" and typically include a magneto-resistive (MR) or giant magneto-resistive (GMR) read element.

The actuator arm assembly 18 pivots about a bearing assembly 26 that is mounted on the base plate 16. Attached to the end of the actuator arm assembly 18 opposite the head 24 is a magnet 28 located between a pair of coils 30. The magnet 28 and the coils 30 are commonly referred to as a voice coil motor (VCM) 32. The spindle motor 14, the head 24 and the VCM 32 are coupled to electronic circuits 34 mounted on a printed circuit board 36 which provide the control electronics of the disk drive 10. The electronic circuits 34 typically include a read channel, a microprocessor-based controller and a random access memory (RAM).

The disk drive 10 typically includes a plurality of disks 12 and, therefore, a plurality of corresponding heads 24 mounted on flexure arms 20 for each disk surface. However, the disk drive 10 may include a single disk 12 as shown in FIG. 1.

During operation of disk drive 10, the disk 12 is rotated at a substantially constant rate about a central axis at a center 38 of the disk 12. To read data from or write data to the disk 12, the head 24 is placed above a desired track of the disk 12 while the disk 12 is spinning. Writing is performed by delivering a variable write current to the head 24 while the head 24 is held close to the desired track. The variable write current creates a variable magnetic field at the write element that induces magnetic polarity transitions into the desired track. These magnetic polarity transitions constitute the stored data.

Reading is performed by sensing the magnetic polarity transitions on the rotating track with the head 24. As the disk 12 spins below the head 24, the magnetic polarity transitions on the track present a varying magnetic field to the read element. The read element converts the varying magnetic field into an analog read signal that is delivered to the read channel for appropriate processing. The read channel converts the analog read signal into a properly timed digital signal that can be recognized by a host computer.

A particularly important type of dual element head is an MR head that includes an MR read element and a separate write element that is usually inductive. MR read elements include a small piece of MR material having a variable resistivity that changes based on an applied magnetic field. That is, as the magnetic field applied to the MR material increases, the resistivity of the MR material, in general, decreases. In practice, the MR material is held near the desired track as a substantially constant sense current is run through the MR material. The magnetic field variations produced by the magnetic transitions on the rotating track change the resistance of the MR material, resulting in a variable voltage across the MR material that is representative of the data stored on the disk (i.e., the analog read signal). MR read elements have gained much popularity in recent years as they typically generate analog read signals having considerably higher voltages than those generated by inductive read elements.

A more detailed view of the head 24 is illustrated in FIG. 2. Portions of the head 24 which face towards the disk 12 are shown. The head 24 includes a read element 40, a read gap 42, a first shield 44, a second shield 46, a write gap 48 and a write element 50. The write element 50 has a width 52 which is typically greater than a width 54 of the read element 40. For example, the width 52 of the write element 50 might be twice the width 54 of the read element 40. Furthermore, the read element 40 is an MR type. Thus, the head 24 is a dual element, write wide/read narrow, MR head although the present invention is applicable to other types of heads.

When writing, a variable write current is used to induce magnetic flux across the write gap 48 between the write element 50 and the first shield 44. The write element 50 and the first shield 44 act as poles for an electromagnet which induces magnetic flux across the write gap 48. The direction of the variable write current defines the direction in which the magnetic flux will be oriented across the write gap 48. In some simple disk drives, flux polarized in one direction across the write gap 48 will record a binary "one" on the disk while flux polarized in the opposite direction will record a binary "zero." In many other disk drives, a change in the direction that the flux travels across the write gap 48 is interpreted as a "one" while the lack of a change is interpreted as a "zero." As the disk 12 travels under the head 24 in the direction indicated by the arrow 56, a series of digital "ones" and "zeros" can be written within the track.

When reading, the magnetic polarity transitions previously written to the disk 12 are coupled to the head 24 in order to recover the stored digital data. When a magnetic polarity transition in the disk 12 passes under the head 24, the read element 40 will generate an analog read signal in response to the changing magnetic field which corresponds to a previously recorded data bit. Conversion of the analog read signal back into a digital signal is performed within the read channel, after which it is passed to an external device such as a host computer. During the read process, the first and second shields 44, 46 form the read gap 42 which serves to focus the flux for a particular magnetic polarity transition onto the read element 40 by shielding the read element 40 from other sources of magnetic flux. In other words, extraneous magnetic flux is filtered away from the read element 40 by the shields 44, 46.

Data storage capacity in disk drives is rapidly increasing. The increase in storage capacity is in large part due to increased recording density on the disk, allowing more data to be stored per unit area on the disk. As the data density continues to increase, the number of tracks per inch (TPI) increases, resulting in decreased track width for each track. In addition, the number of bits per inch (BPI) is also increasing.

The decreased track width impacts several areas of the disk drive. One such area is the head. The width of the read and write elements must be decreased in a similar manner as the track width in order to continue properly reading and writing data to and from the tracks. However, due to limitations in the manufacturing technology used to fabricate heads, it is becoming increasingly difficult to manufacture heads with read and write elements that have the required width. In many heads, the width of the read element is less that the width of the write element. Thus, it is often particularly difficult to fabricate the read element with the appropriate width.

For example, in one current design, the read element has a nominal width of 0.14μ, with a tolerance of 0.04μ. When fabricating the read element, traditional semiconductor fabrication processes are used. However, current photolithographic limits in the fabrication process are roughly the same as the nominal width of the read element. Operating this close to the limits of the fabrication process can often result in heads which do not meet the nominal width and tolerance requirements. As a result, it is common practice to have the heads fabricated and then measured to determine which heads are acceptable. This can be expensive due to the time to measure the heads as well as the cost of unusable heads. Accordingly, it would be advantageous to have a head width which is greater than the limits of the fabrication process while still meeting increased storage capacity demands.

Another area where reduced track width impacts the head is the analog read signal. As a result of the reduced track width, and the resulting decrease in the read element width, the aspect ratio of the read element increases which in turn degrades the analog read signal.

Referring now to FIG. 3, a simplified cross-sectional illustration of the read element 40 is now described. The read element 40 is positioned between two connecting leads 58, 60. A sense current is passed through the first connecting lead 58, as indicated by the arrow 62. The sense current then flows through the read element 40 (across the width 54), and then flows through the second connecting lead 60, as indicated by the arrow 64. The read element 40 includes a soft adjacent layer (SAL), an insulating layer, and an MR sensor layer (not shown). As a result of the biasing properties of the SAL, in combination with the sense current, the magnetization of the read element 40 is deflected as indicated by the arrow 66. As the read element 40 passes over the transitions recorded on the disk 12, the amount of the magnetization deflection in the read element 40 is changed, changing the resistance of the read element 40, thus either increasing or decreasing the voltage across the read element 40, which is used to determine the data stored on the disk 12.

However, as the width 54 of the read element 40 decreases, the aspect ratio of the read element 40 generally increases. The aspect ratio of the read element 40 is the stripe height 68 over the width 54 of the read element 40. In general, due to the decreased track width, the width 54 decreases. However, as the width 54 decreases, the stripe height 68 is generally not reduced, resulting in an increased aspect ratio. The increased aspect ratio results in less magnetization deflection in the read element 40, which in turn reduces the analog read signal. Accordingly, it would be beneficial to have the read element 40 with a relatively low aspect ratio.

Furthermore, while an MR read element has been described, similar problems are encountered with GMR read elements. GMR read elements employ additional structures to produce fixed magnetization and freely rotating magnetization. The analog read signal is based on the angle between the two magnetizations with increased aspect ratios resulting in a reduced angle between the two magnetizations. Thus, reduced aspect ratios would also be beneficial in GMR read elements.

Another difficulty that arises from reduced track width is reduced magnetic flux from the magnetic transitions on the disk. The reduced flux results in a decreased signal-to-noise ratio (SNR) in the analog read signal. Accordingly, it would also be beneficial to have increased SNR with reduced track width.

The head skew angle is generally the angle of the read and write gaps relative to a radial line through the center of the disk. More specifically, the skew angle of the read element is the angle of a line parallel to the read element at the center of the read gap relative to a radial line through the center of the disk. Likewise, the skew angle of the write element is the angle of a line parallel to the write element at the center of the write gap relative to a radial line through the center of the disk. Generally, the difference in the skew angle of the read element and the skew angle of the write element is relatively small, thus the head skew angle is used generally to cover both of these skew angles, with the understanding that the skew angles of the read element and the write element may be somewhat different.

Referring now to FIG. 4, an illustration of head skew in the disk drive 10 is now described. The actuator arm assembly 18 pivots about an actuator pivot 70 and has an arm length A (measured from the actuator pivot 70 to either the center of the read gap or the center of the write gap). The distance from the center 38 of the disk 12 to the end of the actuator arm assembly 18 is the radius R. The distance from the center 38 of the disk 12 to the actuator pivot 70 is designated as M. The head skew angle θ at a radius R is determined according to the following equation:

$$\theta(R) = \frac{\pi}{2} - \cos\left(\frac{A^2 + R^2 - M^2}{2AR}\right)^{-1} \tag{1}$$

Typically the head skew angle is minimized. This is the case for several reasons. One such reason is fly height. A typical disk drive 10 has the head 24 fly very close to the disk 12 at a distance known as the fly height. The head 24 is designed with an air bearing surface (ABS) which maintains the correct fly height when the disk 12 is spinning. Traditionally, the ABS has been sensitive to the head skew angle, with increases in the head skew angle resulting in a change in fly height compared to the fly height when there is zero head skew. Such a change in fly height, in general, is not desirable.

Furthermore, the head skew angle has traditionally been minimized in order to enable writing radially coherent servo patterns to the disk 12 using the head 24. The disk drive 10 may coupled to a servo track writer, which moves the actuator arm assembly 18 to write the servo information. If the head 24 has a relatively high skew angle, it may be difficult to write a radially coherent servo pattern, resulting in a much longer servo write process.

As a result, head skew angles have been minimized in traditional disk drives 10. Many disk drives 10 have a zero degree head skew angle at about a midpoint 72 between an inner diameter 74 and an outer diameter 76 of the disk 12. Such disk drives 10 commonly have a change in skew angle of +/−15 degrees as the head 24 is moved from the midpoint 72 to either the inner diameter 74 or the outer diameter 76. Disk drives 10 also have a zero degree head skew angle at either the inner diameter 74 or the outer diameter 76, with the magnitude of the head skew angle increasing to about 20 degrees at the opposite diameter of the disk 12.

Accordingly, there is a need for (1) improving head tolerances, thus allowing for narrower track widths with fewer heads rejected for not being within specifications, (2) reducing the aspect ratio of the read element, thus allowing for an enhanced analog read signal, and (3) increasing the SNR of the analog read signal.

SUMMARY OF THE INVENTION

The present invention solves the aforementioned problems and meets the aforementioned, and other, needs. The present invention provides a disk drive which employs a head with a high skew angle. This allows the head width to increase according to the inverse of the cosine of the head skew angle. In one embodiment, the head is mounted on the flexure arm at an angle. In another embodiment, the flexure arm is mounted on the actuator arm at an angle. In yet another embodiment, the length of the actuator arm assembly is shortened to allow a greater range of head skew angles across the disk.

Additional features and other embodiments of the present invention will become apparent from the following discussion, particularly when taken together with the accompanying drawings.

DETAILED DESCRIPTION

Figure 1:
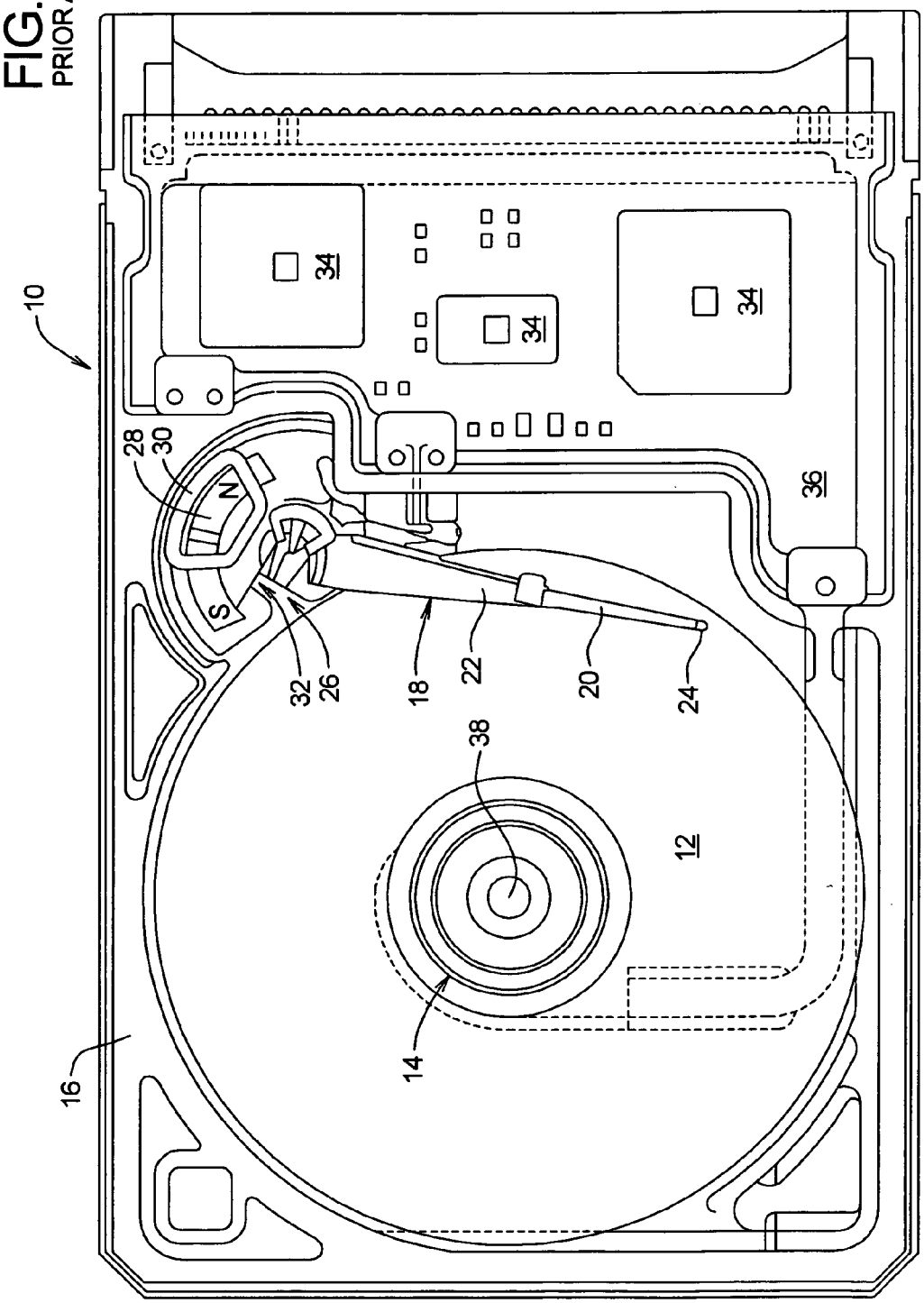
FIG. 1 is a diagrammatic representation illustrating a disk drive.
Figure 2:
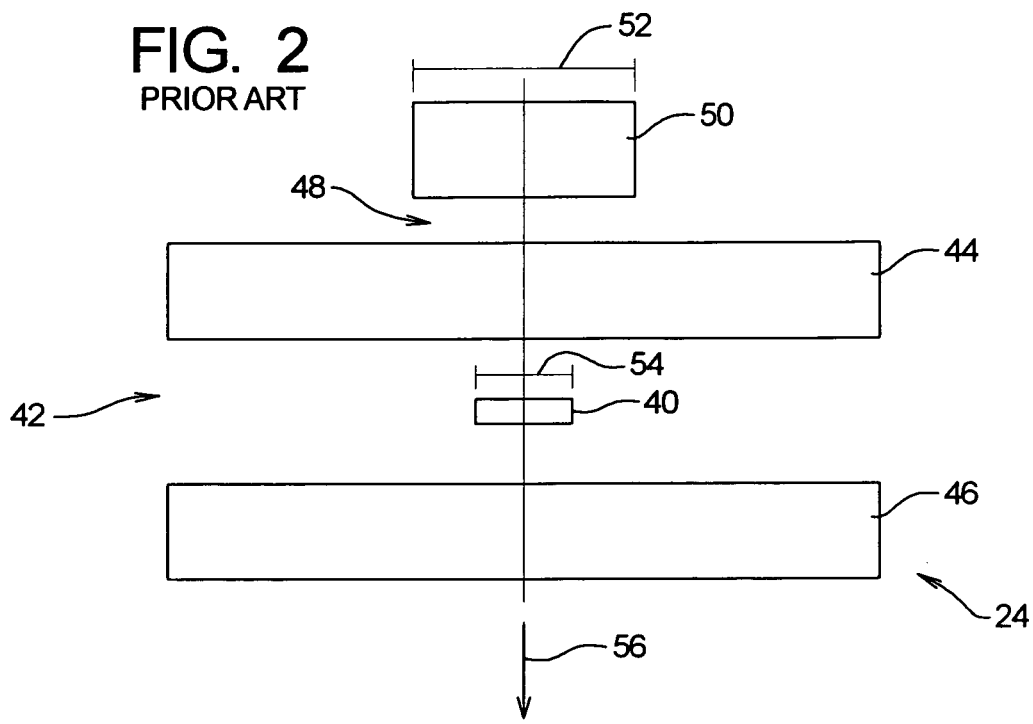
FIG. 2 is a diagrammatic representation illustrating a head in a disk drive.
Figure 3:
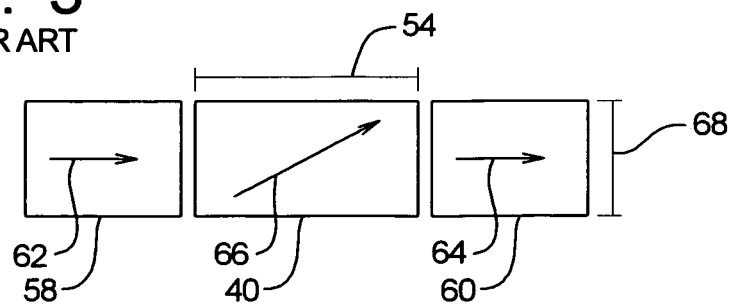
FIG. 3 is a diagrammatic representation illustrating a read element in a head.
Figure 4:
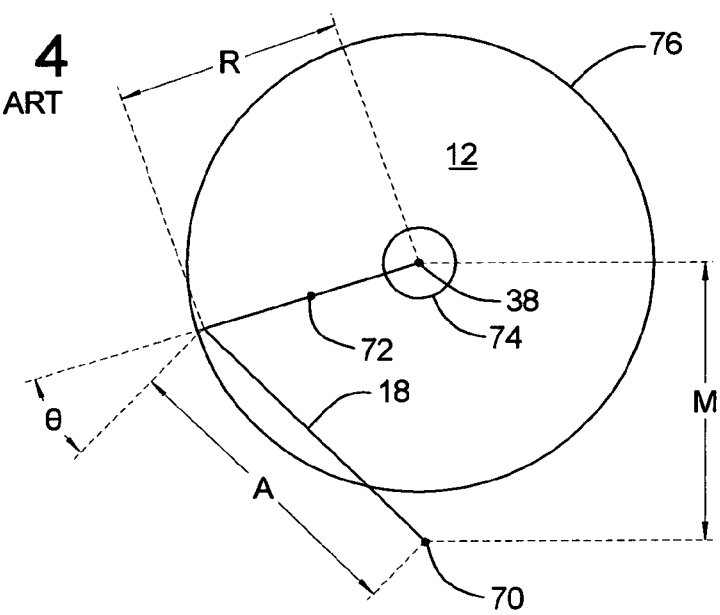
FIG. 4 is a diagrammatic representation illustrating head skew angles.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 5:
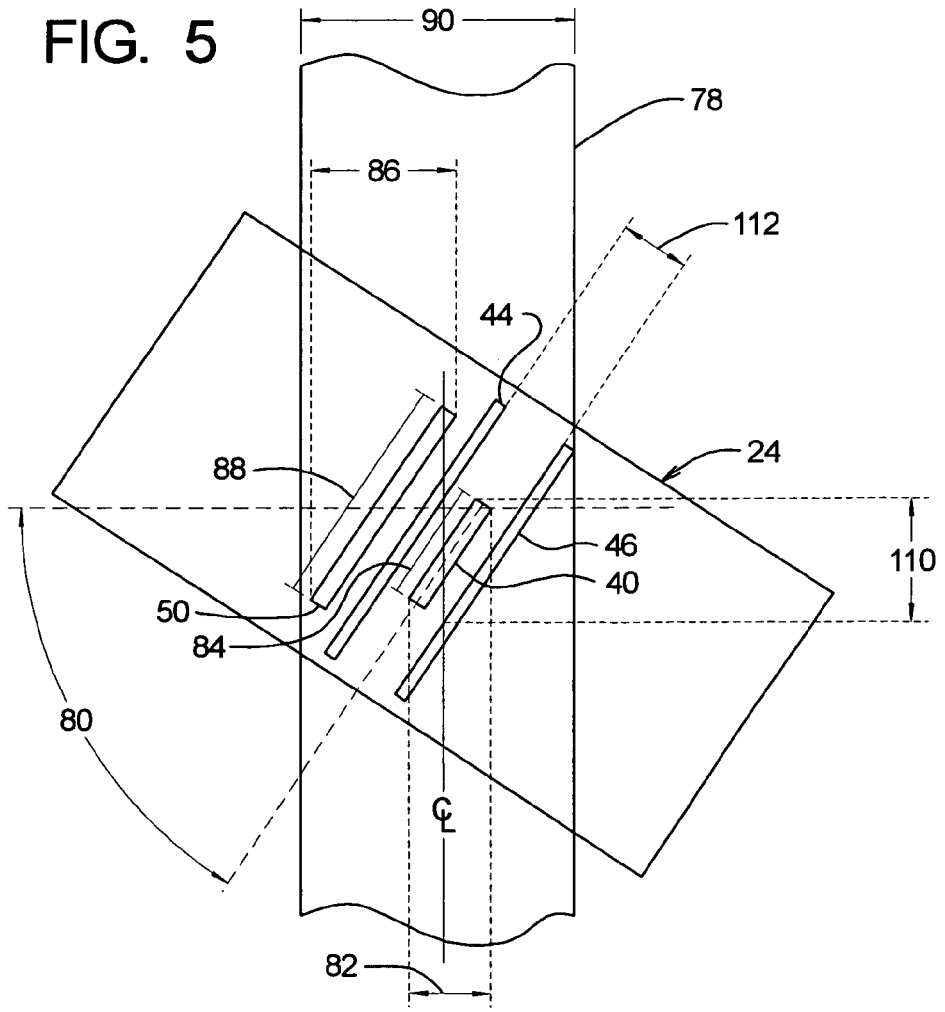
FIG. 5 is a diagrammatic representation illustrating a head in relation to a track for an embodiment of the present invention.

Referring to FIG. 5, a diagrammatic illustration of the head 24 in relation to a track 78 on the disk 12 in accordance with an embodiment of the present invention is now described. In this embodiment, the head 24 has a high skew angle 80 with respect to the track 78. The high skew angle 80 results in the read element 40 and the write element 50 being highly skewed with respect to the track 78. The high skew angle 80 also results in the read element 40 having an effective width 82 with respect to the track 78 which is narrower than a physical width 84 (width 54) of the read element 40. Likewise, the write element 50 has an effective width 86 with respect to the track 78 which is narrower than a physical width 88 (width 52) of the write element 50.

Decreasing the effective widths 82, 86 of the read and write elements 40, 50 has several implications. First, the physical widths 84, 88 of the read and write elements 40, 50 may be increased relative to the track width 90 of the track 78. The physical widths 84, 88 increase according to one over the cosine of the high skew angle 80. For example, the high skew angle 80 may be 60 degrees. In such case, the physical widths 84, 88 are double the effective widths 82, 86. Thus, for a given track width 90, the skewed read and write elements 40, 50 may have a larger physical width than similar elements which are not skewed. A read or write element 40, 50 having a larger physical width is less difficult to manufacture than a read or write element 40, 50 with a smaller physical width. Likewise, the tolerance for the read or write elements 40, 50 is also increased according to the inverse cosine of the high skew angle 80.

Figure 6:
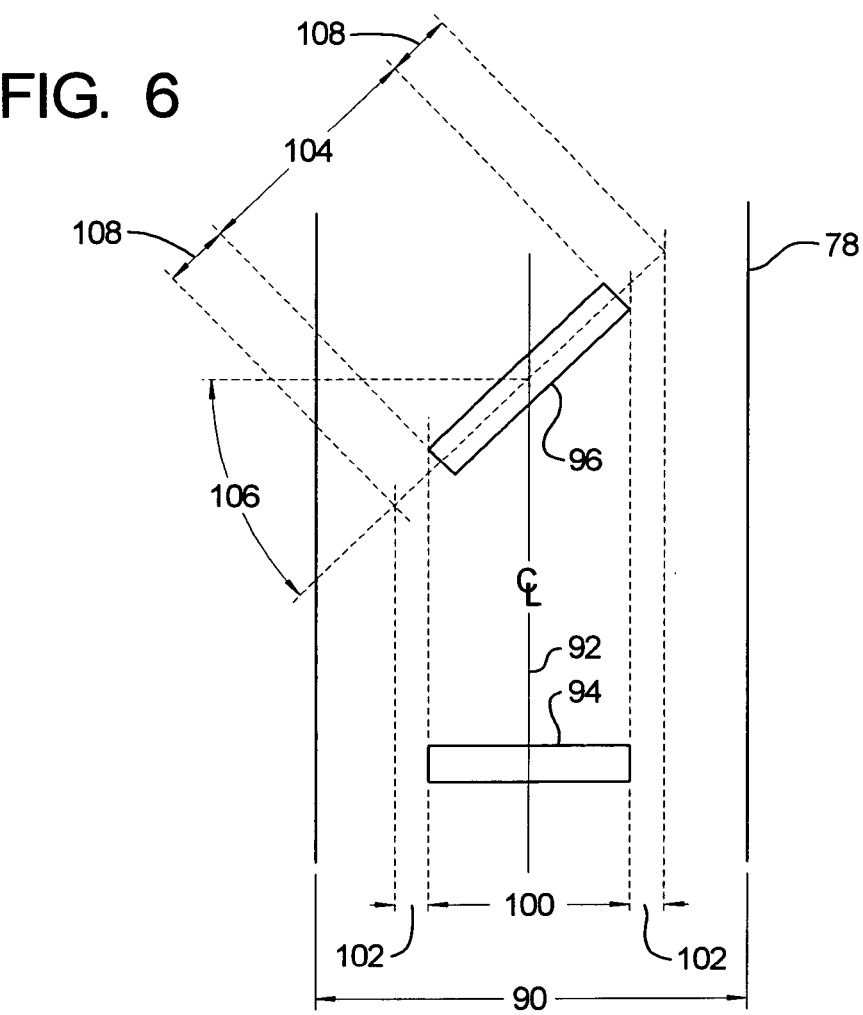
FIG. 6 is a diagrammatic representation illustrating a skewed and non-skewed read or write element in relation to a track for an embodiment of the present invention.

Referring to FIG. 6, a simplified illustration of this principle is now described. The track 78 with a centerline 92 is illustrated, along with a zero skew element 94 (a read or write element) and a high skew element 96 (a read or write element). The nominal width 100 of the zero skew element 94 is illustrated, along with a tolerance 102 on either side of the zero skew element 94. The high skew element 96 has a nominal width 104 which exceeds the nominal width 100 of the zero skew element 94 by the inverse cosine of the high skew angle 106 of the high skew element 96. Likewise, the tolerance 108 for the high skew element 96 exceeds the tolerance 102 for the zero skew element 94 by the inverse cosine of the high skew angle 106. Advantageously, increasing the element width and tolerance increases the margin of the element fabrication process.

Referring again to FIG. 5, the read element 40 reads magnetic signals present between the shields 44, 46. The high skew angle 80 also increases the effective shield spacing 110 over the physical shield spacing 112. The increased effective shield spacing 110 increases the magnetic flux from the disk 12 available to the read element 40. This in turn enhances the SNR for the analog read signal.

However, due to the increased effective shield spacing 110, the width of a bit of data stored in the track 78 must also be increased as compared to the width of a bit of data stored in the track 78 with a low skew angle. The width of a bit of data is commonly known as the pulse width. Accordingly, the pulse width in a disk drive according to this embodiment is increased as compared to the pulse width of a disk drive with a low skew angle. However, the pulse width may be limited by the thermal stability of the disk 12. When the thermal stability limit is reached, the pulse width may not be reduced further because the disk 12 may lose magnetic charge. When the thermal stability limits the reduction of pulse width, having an increased pulse width with a highly skewed head 24 may be beneficial, as the disk 12 will retain magnetic charge and the SNR for the analog read signal is enhanced as compared to a head 24 with reduced skew angle.

The stripe height 68 is also effected by the high skew angle 80. The aspect ratio of the read element 40 can be reduced by increasing the physical width 84 of the read element 40. This allows for a reduced aspect ratio when the stripe height 68 is not adjusted and the physical width 84 of the read element 40 is increased. The reduced aspect ratio allows for larger magnetization deflection in the read element 40, and thus the read element 40 is more sensitive to magnetic flux changes. Accordingly, the analog read signal produced by the read element 40 is enhanced. Additionally, the reduced aspect ratio increases the angle between the fixed magnetization and the freely rotating magnetization in a GMR read element, resulting in an enhanced analog read signal.

The high skew angle 80 also reduces the track width 90 as compared to a track 78 which is not associated with a highly skewed head 24. Because of the increased effective shield spacing 110, the pulse width may be increased for a highly skewed head 24. Therefore, the reduced track width 90 is offset by the increased pulse width, thereby resulting in little or no storage capacity gain or loss for the disk 12 in this embodiment. However, the thermal stability of the disk 12 may limit the pulse width. Thus, where the pulse width is limited by the thermal stability of the disk 12, the reduced track width 90 can increase the storage capacity of the disk 12.

Figure 7:
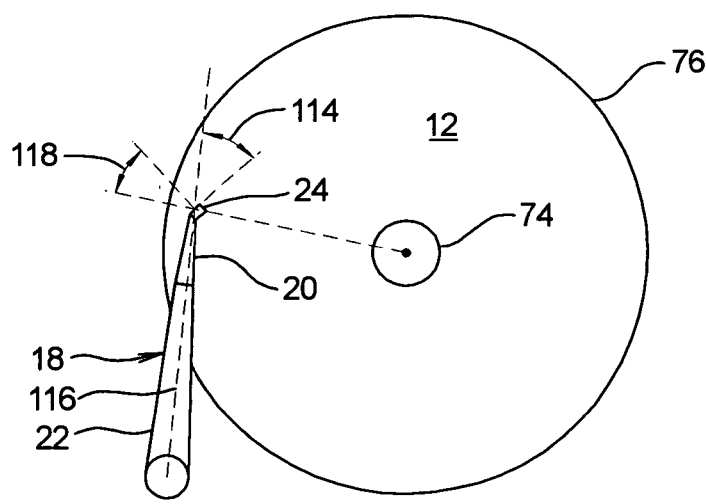
FIG. 7 is a diagrammatic representation illustrating a disk drive with an actuator arm assembly having a head mounted at an angle, according to an embodiment of the present invention.

Referring now to FIG. 7, the head 24 is mounted on the flexure arm 20 at a high mounting angle 114 relative to a centerline 116 of the actuator arm 22 in accordance with an embodiment of the present invention. In addition, the flexure arm 20 is mounted on the actuator arm 22 at no significant angle relative to the centerline 116. As a result, the head 24 has a high skew angle 118. For example, a high mounting angle 114 of 45 degrees produces a high skew angle 118 of approximately 65 degrees at the inner diameter 74 and approximately 45 degrees at the outer diameter 76.

In this embodiment, a servo track writer coupled to the actuator arm assembly 18 such that the head 24 writes servo information to the disk 12 will not produce a radially coherent servo pattern. However, an alternate head can write a radially coherent servo pattern. Similarly, a radially coherent servo pattern can be pre-printed on the disk 12. Likewise, a spiral servo pattern can be used to self-write a radially coherent servo pattern as described in U.S. application Ser. No. 09/853,093, filed May 9, 2001 entitled "Method and Apparatus for Writing and Reading Servo Information Written in a Spiral Fashion," which is incorporated herein by reference in its entirety.

Figure 8:
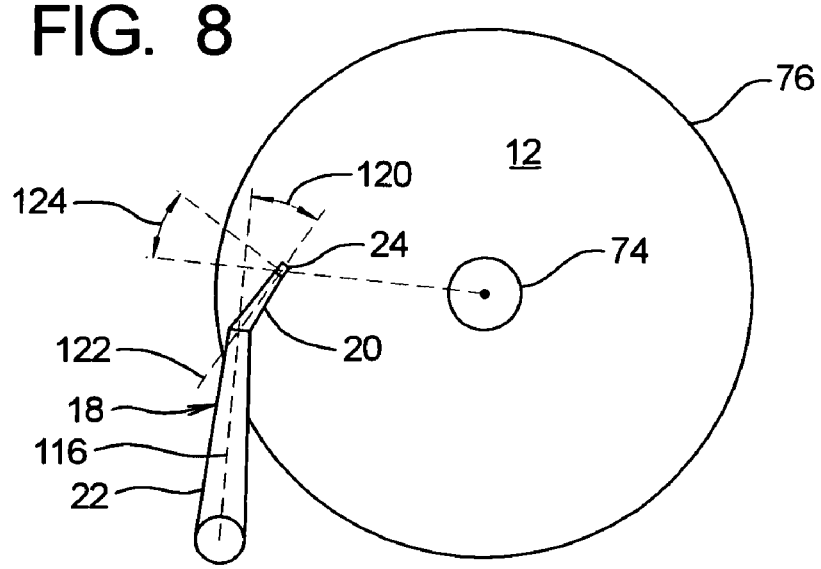
FIG. 8 is a diagrammatic representation illustrating a disk drive with an actuator arm assembly having a flexure arm mounted at an angle, according to an embodiment of the present invention; and, FIG. 9 is a diagrammatic representation illustrating a disk drive with an actuator arm assembly having a relatively short length, according to an embodiment of the present invention.

Referring now to FIG. 8, the flexure arm 20 is mounted on the actuator arm 22 at a high mounting angle 120 relative to the centerline 116 of the actuator arm 22 in accordance with an embodiment of the present invention. In addition, the head 24 is mounted on the flexure arm 20 at no significant angle relative to a centerline 122 of the flexure arm 20. This results in the head 24 having a high skew angle 124. For example, a high mounting angle 120 produces a high skew angle 124 of approximately 65 degrees at the inner diameter 74 and approximately 45 degrees at the outer diameter 76.

In this embodiment, a radially coherent servo pattern can be produced in a similar fashion as described for the embodiment in FIG. 7.

Figure 9:
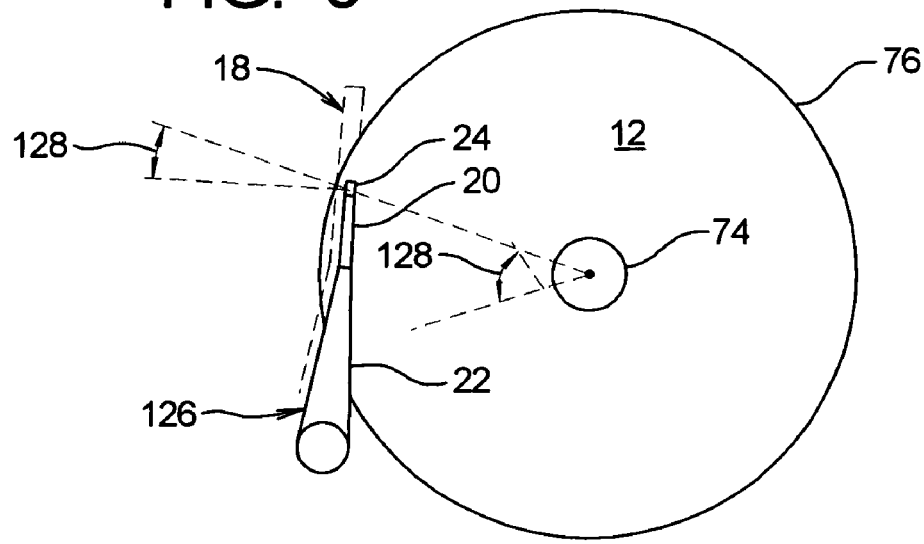

Referring now to FIG. 9, a short actuator arm assembly 126 has a relatively short length as compared to the actuator arm assembly 18 (shown in phantom) in accordance with an embodiment of the present invention. The short actuator arm assembly 126 results in a relatively large difference in the skew angle 128 between the inner diameter 74 and the outer diameter 76. For example, the skew angle 128 near the inner diameter 74 is approximately 60 degrees and near the outer diameter 76 is approximately 20 degrees.

In this embodiment, a servo track writer coupled to the short actuator arm assembly 126 such that the head 24 that writes servo information to the disk 12 can produce a radially coherent servo pattern.

Track misregistration is commonly higher toward the outer diameter 76 due to a number of factors such as disk flutter. Advantageously, by decreasing the skew angle as the head 24 moves from the inner diameter 74 to the outer diameter 76, the effective widths 82, 86 of the read and write elements 40, 50 increase as the head 24 moves from the inner diameter 74 to the outer diameter 76, thereby minimizing track misregistration towards the outer diameter 76 where it is most problematic.

The above embodiments have been described with an MR head. However, other heads and read/write elements including GMR heads may be used. Furthermore, the skew angle can be zero degrees when the read element and the write element are located at a position off of the data storage region of the disk.

While an effort has been made to describe some alternatives to the preferred embodiments, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A disk drive, comprising:
   a magnetic disk having an annular data storage region between inner and outer diameters; and
   an actuator arm assembly including an actuator arm, a flexure arm mounted on a first end of said actuator arm, and a read element and a write element mounted on an end of said flexure arm opposite said actuator arm, wherein said actuator arm assembly rotates about a second end of said actuator arm opposite said first end of said actuator arm, said read element reads from said disk and said write element writes to said disk;
   wherein said read element has a read element skew angle and said write element has a write element skew angle,
   wherein at least one of said read element skew angle and said write element skew angle decreases as said read element and said write element move from said inner diameter to said outer diameter and is never less than 45 degrees while said read element and said write element are located over said data storage region, and wherein the physical widths of said read element and said write element are at least double the effective widths of said read element and said write element at said inner diameter.

2. A disk drive, as claimed in claim 1, wherein said data storage region has a plurality of concentric tracks which include sectors, said sectors including data sectors and servo sectors, and said servo sectors are written in a non-radially coherent manner by said write element due to said write element skew angle.

3. A disk drive, as claimed in claim 1, wherein said data storage region has a plurality of concentric tracks which include sectors, said sectors including data sectors and servo sectors, and said servo sectors are printed on said disk.

4. A disk drive, as claimed in claim 1, wherein at least one of said read element and said write element is mounted on said flexure arm such that at least one of said read element and said write element is not perpendicular to a centerline of said flexure arm, and said centerline of said flexure arm is parallel to a centerline of said actuator arm.

5. A disk drive, as claimed in claim 1, wherein at least one of said read element and said write element is mounted on said flexure arm such that at least one of said read element and said write element is perpendicular to a centerline of said flexure arm, and said flexure arm is mounted on said actuator arm such that said centerline of said flexure arm is not parallel to a centerline of said actuator arm.

6. A disk drive, as claimed in claim 1, wherein at least one of said read element and said write element is mounted on said flexure arm such that at least one of said read element and said write element is perpendicular to a centerline of said flexure arm, and said flexure arm is mounted on said actuator arm such that said centerline of said flexure arm is parallel to a centerline of said actuator arm.

7. A disk drive, as claimed in claim 1, wherein said read element and said write element are located on a head which is substantially rectangular in shape.

8. A disk drive, comprising:
a magnetic disk having an annular data storage region extending from an inner diameter to an outer diameter; and
an actuator arm assembly including an actuator arm, a flexure arm mounted on a first end of said actuator arm at a non-zero angle relative to said actuator arm, and a read element and a write element mounted to an end of said flexure arm opposite said actuator arm at a 90 degree angle relative to said flexure arm, wherein said actuator arm assembly rotates about a second end of said actuator arm opposite said first end of said actuator arm, said read element reads from said disk and said write element writes to said disk,
wherein a skew angle of at least one of said read element and said write element relative to said data storage region decreases as said read element and said write element move from said inner diameter to said outer diameter and is never less than 45 degrees within said data storage region, and
wherein the physical widths of said read element and said write element are at least double the effective widths of said read element and said write element at said inner diameter.

9. A disk drive, as claimed in claim 7, wherein said skew angle is greater than 60 degrees at said inner diameter.

10. A disk drive, as claimed in claim 7, wherein said data storage region includes a plurality of concentric tracks which include sectors, said sectors including data sectors and servo sectors, and said servo sectors are written in a non-radially coherent manner by said write element due to said skew angle of said write element.

11. A disk drive, as claimed in claim 7, wherein said data storage region includes a plurality of concentric tracks which include sectors, said sectors including data sectors and servo sectors, and said servo sectors are printed on said disk.

12. A disk drive, as claimed in claim 7, wherein a tolerance of at least one of said read and write elements is increased by the inverse cosine of said skew angle.

13. A disk drive, as claimed in claim 7, wherein an effective width of at least one of said read and write elements is increased by the inverse cosine of said skew angle.

14. A disk drive, as claimed in claim 7, wherein a signal-to-noise ratio produced by said read element is at least 6 dB.

15. A disk drive, as claimed in claim 7, wherein said data storage region includes a plurality of concentric tracks, each of said tracks having a width associated therewith, and the width of said tracks corresponds to the cosine of said skew angle of said write element.

16. A disk drive, as claimed in claim 15, wherein said write element has a first physical width,
wherein the width of said tracks corresponds to the product of said first physical width and the cosine of said skew angle of said write element.

17. A disk drive, as claimed in claim 8, wherein said read element and said write element are located on a head which is substantially rectangular in shape.

18. A disk drive, comprising:
a magnetic disk having an annular data storage region between inner and outer diameters; and
an actuator arm assembly including an actuator arm, a flexure arm mounted to a first end of said actuator arm, and a read element and a write element mounted to an end of said flexure arm opposite said actuator arm, wherein said actuator arm assembly rotates about a second end of said actuator arm opposite said first end of said actuator arm, said read element reads from said disk and said write element writes to said disk,
wherein a skew angle of at least one of said read and write elements decreases as said read element and said write element move from said inner diameter to said outer diameter, is never less than 45 degrees while said read element and said write element are located within said data storage region and is zero degrees when said read element and said write element are located at a position off of said data storage region, and
wherein the physical widths of said read element and said write element are at least double the effective widths of said read element and said write element at said inner diameter.

19. A disk drive, as claimed in claim 18, wherein at least one of said read element and said write element is mounted on said flexure arm such that at least one of said read element and said write element is perpendicular to a centerline of said flexure arm, and said flexure arm is mounted on actuator arm such that said centerline of said flexure arm is not parallel to a centerline of said actuator arm.

20. A disk drive, as claimed in claim 18, wherein at least one of said read element and said write element is mounted on said flexure arm such that at least one of said read element and said write element is perpendicular to a centerline of said flexure arm, and said flexure arm is mounted on said actuator arm such that said centerline of said flexure arm is parallel to a centerline of said actuator arm.

21. A disk drive, as claimed in claim 18, wherein said data storage region includes a plurality of concentric tracks which include sectors, said sectors including data sectors and servo sectors, and said servo sectors are written in a non-radially coherent manner by said write element due to said skew angle of said write element.

22. A disk drive, as claimed in claim 18, wherein said data storage region includes a plurality of concentric tracks which include sectors, said sectors including data sectors and servo sectors, and said servo sectors are printed on said disk.

23. A disk drive, as claimed in claim 18, wherein said read element has a first physical width and said write element has a second physical width, and a tolerance of at least one of said first and second physical widths is increased by the inverse cosine of said skew angle.

24. A disk drive, as claimed in claim 23, wherein a signal-to-noise ratio produced by said read element is at least 6 dB.

25. A disk drive, as claimed in claim 18, wherein said data storage region includes a plurality of concentric tracks, and the width of said tracks corresponds to the cosine of said skew angle of said write element.

26. A disk drive, as claimed in claim 18, wherein said read element has a first effective width and said write element has a second effective width, and at least one of said first and second effective widths is increased by the inverse cosine of said skew angle.

27. A disk drive, as claimed in claim 18, wherein said read element and said write element are located on a head which is substantially rectangular in shape.

28. A disk drive, comprising:
a magnetic disk having an annular data storage region including a plurality of concentric tracks between inner and outer diameters; and
an actuator arm assembly including an actuator arm, a flexure arm mounted on a first end of said actuator arm, and a head mounted on an end of said flexure arm opposite said actuator arm, said head having a read element and a write element, wherein said actuator arm assembly rotates about a second end of said actuator arm opposite said first end of said actuator arm, said read element reads from said disk and said write element writes to said disk,
wherein a skew angle of said read element and write element relative to said tracks decreases as said head moves from said inner diameter to said outer diameter and is at least 60 degrees at said inner diameter and at least 20 degrees at said outer diameter, and
wherein the physical widths of said read element and said write element are at least double the effective widths of said read element and said write element at said inner diameter.

29. A disk drive, as claimed in claim 28, wherein said skew angle at said inner diameter is at least 45 degrees.

30. A disk drive, as claimed in claim 28, wherein said tracks include sectors, said sectors including data sectors and servo sectors, and said servo sectors are written in a non-radially coherent manner by said write element due to said skew angle.

31. A disk drive, as claimed in claim 28, wherein said tracks include sectors, said sectors including data sectors and servo sectors, and said servo sectors are printed on said disk.

32. A disk drive, as claimed in claim 28, wherein said head is substantially rectangular in shape.

33. A disk drive, comprising:
a magnetic disk having a data storage region including a plurality of concentric tracks between inner and outer diameters in which all data in said data storage region is recorded, said tracks having associated track widths; and
an actuator arm assembly including an actuator arm, a flexure arm mounted on a first end of said actuator arm, and a head mounted on an end of said flexure arm opposite said actuator arm, said head having a read element and a write element, wherein said actuator arm assembly rotates about a second end of said actuator arm opposite said first end of said actuator arm, said read element reads from said disk and said write element writes to said disk,
wherein the physical width of at least one of said write element and said read element is greater than said track width for each of said tracks,
wherein a skew angle of said head relative to said tracks decreases as said head moves from said inner diameter to said outer diameter and is not less than 45 degrees at said inner diameter, and
wherein the physical widths of said read element and said write element are at least double the effective widths of said read element and said write element at said inner diameter.

34. A disk drive, as claimed in claim 33, wherein said tracks include sectors, said sectors including data sectors and servo sectors, and said servo sectors are written in a non-radially coherent manner by said write element due to said skew angle.

35. A disk drive, as claimed in claim 33, wherein said tracks include sectors, said sectors including data sectors and servo sectors, and said servo sectors are printed on said disk.

36. A disk drive, as claimed in claim 33, wherein said head is mounted on said flexure arm such that at least one of said read element and said write element is not perpendicular to a centerline of said flexure arm.

37. A disk drive, as claimed in claim 33, wherein said skew angle is zero degrees when said head is located at a position off of said data storage region.

38. A disk drive, as claimed in claim 33, wherein said skew angle is greater than 60 degrees at said inner diameter.

39. A disk drive, as claimed in claim 33, wherein said head is mounted on said flexure arm such that said head is not perpendicular to a centerline of said flexure arm, and said flexure arm is mounted on said actuator arm such that said centerline of said flexure arm is parallel to a centerline of said actuator arm.

40. A disk drive, as claimed in claim 33, wherein said head is mounted on said flexure arm such that said head is perpendicular to a centerline of said flexure arm, and said flexure arm is mounted on said actuator arm such that said centerline of said flexure arm is not parallel to a centerline of said actuator arm.

41. A disk drive, as claimed in claim 40, wherein said head is mounted on said flexure arm such that said head is perpendicular to a centerline of said flexure arm, and said flexure arm is mounted on said actuator arm such that said centerline of said flexure arm is parallel to a centerline of said actuator arm.

42. A disk drive, as claimed in claim 33, wherein said head is substantially rectangular in shape.

43. A method for increasing the tolerance of a read element in a disk drive, comprising:
  providing a head having said read element that reads from a magnetic disk, said read element having a nominal width and a width tolerance; and
  skewing said read element to a skew angle of 45 degrees or more at each track located in a data storage region of said disk such that said width tolerance is increased by approximately the inverse cosine of said skew angle, wherein said skew angle decreases as said head moves from an inner diameter to an outer diameter of said disk, and said nominal width is at least double an effective width of said read element at said inner diameter.

44. A method, as claimed in claim 43, wherein said skewing step includes:
  selecting said skew angle such that said width tolerance is increased by at least 30 percent.

45. A method, as claimed in claim 43, wherein said skewing step includes:
  selecting said skew angle such that said width tolerance is increased by at least 50 percent.

46. A method, as claimed in claim 43, wherein said skewing step includes:
  selecting said skew angle such that said width tolerance is increased by at least 100 percent.

47. A method, as claimed in claim 43, wherein said head is substantially rectangular in shape.

48. A method for increasing head element physical widths in a disk drive, said disk drive having a data storage region with a radial extent between inner and outer diameters, comprising:
  providing a head having a read element having a first physical width and a write element having a second physical width, wherein said read element reads from said data storage region and said write element writes to said data storage region; and
  skewing said head at a skew angle of 45 degrees or more throughout the radial extent of the data storage region, such that said read element has a first effective width and said write element has a second effective width, wherein said first and second effective widths are reduced compared to said first and second physical widths and said skew angle is increased as said head moves from said outer diameter to said inner diameter, and said first and second effective widths are at most one-half said first and second physical widths at said inner diameter.

49. A method, as claimed in claim 48, further comprising:
  reducing a track width to correspond to said first and second effective widths.

50. A method, as claimed in claim 48, wherein said skewing step includes:
  selecting said skew angle such that said first and second effective widths are 70 percent of said first and second physical widths.

51. A method, as claimed in claim 50, wherein said skewing step includes:
  selecting said skew angle such that said first and second effective widths are 60 percent of said first and second physical widths.

52. A method, as claimed in claim 48, wherein said skewing step includes:
  selecting said skew angle such that said first and second effective widths are 50 percent of said first and second physical widths.

53. A method, as claimed in claim 48, wherein said head is substantially rectangular in shape.

54. A method for decreasing track widths on magnetic media in a disk drive, comprising:
  providing a head having an element for reading from or writing to tracks located in a data storage region of said magnetic media between inner and outer diameters of said magnetic media, said element having a nominal width;
  skewing said element to a skew angle of 45 degrees or more relative to each track such that an effective width of said element relative to said tracks is reduced as compared to said nominal width and said skew angle is increased as said head moves from said outer diameter to said inner diameter and said effective width is at most one-half said nominal width at said inner diameter; and
  selecting a track width of said tracks to correspond to said effective width.

55. A method, as claimed in claim 54, further comprising:
  selecting said skew angle such that said track width is narrower than said nominal width.

56. A method, as claimed in claim 54, wherein said selecting step includes:
  reducing said track width relative to a nominal track width which corresponds to said nominal width.

57. A method, as claimed in claim 56, wherein said reducing step includes:
  reducing said track width by at least 30 percent.

58. A method, as claimed in claim 56, wherein said reducing step includes:
  reducing said track width by at least 40 percent.

59. A method, as claimed in claim 56, wherein said reducing step includes:
  reducing said track width by at least 50 percent.

60. A method, as claimed in claim 54, wherein said head is substantially rectangular in shape.

61. A disk drive, comprising:
  a magnetic disk including concentric tracks and inner and outer diameters; and
  an actuator arm assembly including an actuator arm, a flexure arm mounted on a first end of said actuator arm, and a head mounted on an end of said flexure arm opposite said actuator arm, said head having a read element and a write element, wherein said actuator arm assembly rotates about a second end of said actuator arm opposite said first end of said actuator arm, said read element reads from said disk and said write element writes to said disk,
  wherein a skew angle of said head relative to said tracks decreases as said head moves from said inner diameter to said outer diameter, thereby increasing the effective widths of said read and write elements relative to the physical widths of said read and write elements as said head moves from said inner diameter to said outer diameter, said skew angle is at least 45 degrees at said inner diameter and at least 20 degrees at said outer diameter, and said physical widths are at least double said effective widths at said inner diameter.

62. A disk drive, as claimed in claim 61, wherein said skew angle is at least 60 degrees at said inner diameter.

63. A disk drive, as claimed in claim 61, wherein said skew angle is at least 45 degrees at said outer diameter.

64. A disk drive, as claimed in claim 61, wherein said skew angle is at least 60 degrees at said inner diameter and at least 45 degrees at said outer diameter.

65. A disk drive, as claimed in claim 61, wherein said skew angle is approximately 65 degrees at said inner diameter and approximately 45 degrees at said outer diameter.

66. A disk drive, as claimed in claim 61, wherein said skew angle is approximately 60 degrees at said inner diameter and approximately 20 degrees at said outer diameter.

67. A disk drive, as claimed in claim 61, wherein said physical widths are double said effective widths at said inner diameter.

68. A disk drive, as claimed in claim 61, wherein said head is mounted on said flexure arm such that said head is not perpendicular to a centerline of said flexure arm, and said flexure arm is mounted on said actuator arm such that said centerline of said flexure arm is parallel to a centerline of said actuator arm.

69. A disk drive, as claimed in claim 61, wherein said head is mounted on said flexure arm such that said head is perpendicular to a centerline of said flexure arm, and said flexure arm is mounted on said actuator arm such that said centerline of said flexure arm is not parallel to a centerline of said actuator arm.

70. A disk drive, as claimed in claim 61, wherein said head is mounted on said flexure arm such that said head is perpendicular to a centerline of said flexure arm, and said flexure arm is mounted on said actuator arm such that said centerline of said flexure arm is parallel to a centerline of said actuator arm.

71. A disk drive, comprising:
a magnetic disk having an annular data storage region between inner and outer diameters; and
an actuator arm assembly including an actuator arm, a flexure arm mounted on a first end of said actuator arm, and a read element and a write element mounted on an end of said flexure arm opposite said actuator arm, wherein said actuator arm assembly rotates about a second end of said actuator arm opposite said first end of said actuator arm, said read element reads from said disk and said write element writes to said disk;
wherein said read element has a read element skew angle and said write element has a write element skew angle,
wherein at least one of said read element skew angle and said write element skew angle decreases as said read element and said write element move from said inner diameter to said outer diameter and is never less than 45 degrees while said read element and said write element are located over said data storage region, and
wherein at least one of said read element and said write element is mounted on said flexure arm such that at least one of said read element and said write element is perpendicular to a centerline of said flexure arm, and said flexure arm is mounted on said actuator arm such that said centerline of said flexure arm is not parallel to a centerline of said actuator arm.

72. A disk drive, comprising:
a magnetic disk having an annular data storage region between inner and outer diameters; and
an actuator arm assembly including an actuator arm, a flexure arm mounted to a first end of said actuator arm, and a read element and a write element mounted to an end of said flexure arm opposite said actuator arm, wherein said actuator arm assembly rotates about a second end of said actuator arm opposite said first end of said actuator arm, said read element reads from said disk and said write element writes to said disk;
wherein a skew angle of at least one of said read and write elements decreases as said read element and said write element move from said inner diameter to said outer diameter, is never less than 45 degrees while said read element and said write element are located within said data storage region and is zero degrees when said read element and said write element are located at a position off of said data storage region, and
wherein at least one of said read element and said write element is mounted on said flexure arm such that at least one of said read element and said write element is perpendicular to a centerline of said flexure arm, and said flexure arm is mounted on said actuator arm such that said centerline of said flexure arm is not parallel to a centerline of said actuator arm.

73. A disk drive, comprising:
a magnetic disk having a data storage region including a plurality of concentric tracks between inner and outer diameters in which all data in said data storage region is recorded, said tracks having associated track widths; and
an actuator arm assembly including an actuator arm, a flexure arm mounted on a first end of said actuator arm, and a head mounted on an end of said flexure arm opposite said actuator arm, said head having a read element and a write element, wherein said actuator arm assembly rotates about a second end of said actuator arm opposite said first end of said actuator arm, said read element reads from said disk and said write element writes to said disk,
wherein the width of at least one of said write element and said read element is greater than said track width for each of said tracks,
wherein a skew angle of said head relative to said tracks decreases as said head moves from said inner diameter to said outer diameter and is not less than 45 degrees at said inner diameter, and
wherein said head is mounted on said flexure arm such that said head is perpendicular to a centerline of said flexure arm, and said flexure arm is mounted on said actuator arm such that said centerline of said flexure arm is not parallel to a centerline of said actuator arm.

74. A disk drive, comprising:
a magnetic disk including concentric tracks and inner and outer diameters; and
an actuator arm assembly including an actuator arm, a flexure arm mounted on a first end of said actuator arm, and a head mounted on an end of said flexure arm opposite said actuator arm, said head having a read element and a write element, wherein said actuator arm assembly rotates about a second end of said actuator arm opposite said first end of said actuator arm, said read element reads from said disk and said write element writes to said disk,
wherein a skew angle of said head relative to said tracks decreases as said head moves from said inner diameter to said outer diameter, thereby increasing the effective widths of said read and write elements relative to the physical widths of said read and write elements as said head moves from said inner diameter to said outer diameter, and said skew angle is at least 45 degrees at said inner diameter and at least 20 degrees at said outer diameter, and
wherein said head is mounted on said flexure arm such that said head is perpendicular to a centerline of said flexure arm, and said flexure arm is mounted on said actuator arm such that said centerline of said flexure arm is not parallel to a centerline of said actuator arm.

* * * * *